United States Patent
Lenger et al.

(10) Patent No.: US 7,615,156 B2
(45) Date of Patent: Nov. 10, 2009

(54) DEVICE FOR IN SITU BIOREMEDIATION OF LIQUID WASTE

(76) Inventors: Markus Johannes Lenger, 28101 Klamath Ct., Laguna Niguel, CA (US) 92677; Robert Edwin Carr, 11432 Old 40 Hwy., Odessa, MO (US) 64076

(*) Notice: Subject to any disclaimer, the term of this patent is extended or adjusted under 35 U.S.C. 154(b) by 115 days.

(21) Appl. No.: 11/779,841

(22) Filed: Jul. 18, 2007

(65) Prior Publication Data
US 2008/0017574 A1 Jan. 24, 2008

Related U.S. Application Data

(63) Continuation-in-part of application No. 11/625,316, filed on Jan. 20, 2007, now abandoned.

(60) Provisional application No. 60/760,458, filed on Jan. 20, 2006.

(51) Int. Cl.
*C02F 3/06* (2006.01)

(52) U.S. Cl. .............. 210/608; 210/615; 210/150; 210/151; 210/538

(58) Field of Classification Search .............. 210/608, 210/615, 617, 150, 151, 194, 220, 538
See application file for complete search history.

(56) References Cited

U.S. PATENT DOCUMENTS

| | | | | |
|---|---|---|---|---|
| 2,188,162 A | * | 1/1940 | Schulhoff | 210/615 |
| 3,589,518 A | * | 6/1971 | Brebion et al. | 210/150 |
| 3,882,027 A | * | 5/1975 | Lunt | 210/150 |
| 4,231,863 A | * | 11/1980 | Sutphin | 210/151 |
| 4,810,385 A | * | 3/1989 | Hater et al. | 210/150 |
| 4,925,564 A | * | 5/1990 | Francis | 210/608 |
| 4,985,182 A | * | 1/1991 | Basse et al. | 210/150 |
| 5,202,027 A | * | 4/1993 | Stuth | 210/151 |
| 5,326,475 A | * | 7/1994 | Kent | 210/615 |
| 5,690,827 A | * | 11/1997 | Simmering et al. | 210/615 |
| 5,840,182 A | | 11/1998 | Lucido et al. | |
| 5,911,877 A | | 6/1999 | Perez et al. | |
| 6,174,433 B1 | * | 1/2001 | Futami | 210/195.3 |
| 6,187,193 B1 | | 2/2001 | Ozama | |
| 6,335,191 B1 | | 1/2002 | Kiplinger et al. | |
| 6,758,965 B2 | | 7/2004 | Chen | |
| 7,252,766 B2 | * | 8/2007 | Stuth et al. | 210/151 |
| 2003/0008382 A1 | | 1/2003 | Tisinger et al. | |
| 2003/0159989 A1 | * | 8/2003 | Davis et al. | 210/150 |
| 2005/0269262 A1 | * | 12/2005 | McBride | 210/615 |
| 2007/0272603 A1 | * | 11/2007 | Oya | 210/150 |

* cited by examiner

*Primary Examiner*—Christopher Upton

(57) ABSTRACT

A bioremediation device for liquid waste includes a medium for forming a microbial film and for exposing the microbial film to an effluent to decompose a first substance in the effluent and to produce a second substance from the decomposition of first substance. An aerator is coupled to the medium to supply the microbial film with oxygen and to accelerate the effluent around the microbial film.

17 Claims, 4 Drawing Sheets

US 7,615,156 B2

DEVICE FOR IN SITU BIOREMEDIATION OF LIQUID WASTE

CROSS-REFERENCE TO RELATED APPLICATIONS

This application is a continuation-in-part of U.S. Non-Provisional patent application Ser. No. 11/625,316, filed on Jan. 20, 2007, which claims the benefit of U.S. Provisional Patent Application Ser. No. 60/760,458, filed on Jan. 20, 2006.

BACKGROUND OF THE INVENTION

1. Field of the Invention

The present invention is directed to the treatment of liquid waste. More specifically, but without limitation thereto, the present invention is directed to devices for processing liquid waste to remove substances that may impair the functioning of waste disposal utilities such as sewage treatment plants and sewage pumping stations inside a grease interceptor or grease vault.

2. Description of Related Art

Food service establishments typically produce liquid waste in the form of fats, oils and grease, commonly referred to as "FOG." Because discharging FOG directly into the sewer system is undesirable and generally prohibited, a grease interceptor or grease vault is commonly installed to remove FOG from waste water prior to discharging the waste water into the municipal sewer system. Depending on the amount of FOG and other waste ingredients contained in the liquid waste, the grease interceptor fills with insoluble solids that need to be pumped out of the grease interceptor, typically several times a year.

The insoluble FOG liquid waste mixture is generally removed to a landfill, processed at a suitable wastewater treatment plant, or reprocessed into non-toxic byproducts. As grease interceptors rely on gravity separation—the lighter substances like FOG float to the top—most regulatory agencies require now proof that any process employed in a grease interceptor does not interfere with the designed and certified gravity separation process of any existing or new grease interceptor. As a result full or partial aeration of a grease interceptor is prohibited. Only if definite proof exists that no interference with gravity separation or retention time is achieved is approval given.

SUMMARY OF THE INVENTION

In one embodiment, a bioremediation device includes a medium for forming a microbial film and for exposing the microbial film to an effluent to decompose a first substance carried in the effluent and to produce a second substance from the decomposition of first substance. An aerator is coupled to the medium to supply the microbial film with oxygen and to accelerate the effluent around the microbial film.

In another embodiment, a bioremediation device includes steps of forming a microbial film on a medium, exposing the microbial film to an effluent to decompose a first substance carried in the effluent, and producing a second substance from the decomposition of the first substance. An air flow is directed over the microbial film to supply the microbial film with oxygen and to accelerate the effluent around the microbial film.

BRIEF DESCRIPTION OF THE DRAWINGS

The above and other aspects, features and advantages will become more apparent from the description in conjunction with the following drawings presented by way of example and not limitation, wherein like references indicate similar elements throughout the several views of the drawings, and wherein.

Figure 1:
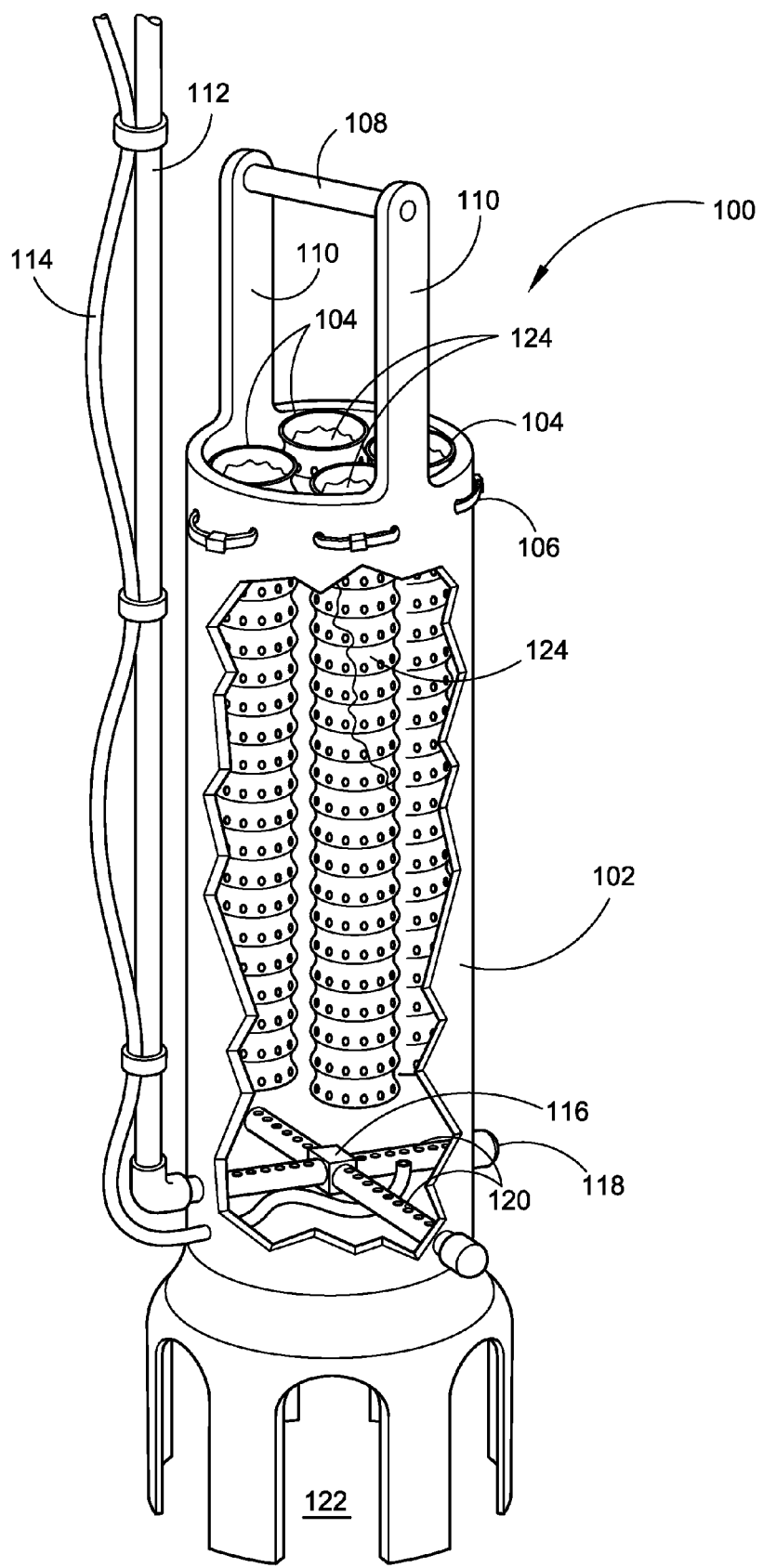
FIG. 1 illustrates a perspective cutaway view of a bioremedial device for forming a microbial film on corrugated tubes.

Elements in the figures are illustrated for simplicity and clarity and have not necessarily been drawn to scale. For example, the dimensions, sizing, and/or relative placement of some of the elements in the figures may be exaggerated relative to other elements to clarify distinctive features of the illustrated embodiments. Also, common but well-understood elements that may be useful or necessary in a commercially feasible embodiment are often not depicted in order to facilitate a less obstructed view of the illustrated embodiments.

DESCRIPTION OF THE ILLUSTRATED EMBODIMENTS

The following description is not to be taken in a limiting sense, rather for the purpose of describing by specific examples the general principles that are incorporated into the illustrated embodiments. For example, certain actions or steps may be described or depicted in a specific order to be performed. However, practitioners of the art will understand that the specific order is only given by way of example and that the specific order does not exclude performing the described steps in another order to achieve substantially the same result. Also, the terms and expressions used in the description have the ordinary meanings accorded to such terms and expressions in the corresponding respective areas of inquiry and study except where other meanings have been specifically set forth herein.

A grease interceptor or grease vault is used by food service establishments to remove fats, oils and grease ("FOG") from waste water effluent prior to discharging the effluent into the sewage system. Typically, the grease interceptor or vault has multiple chambers, and the effluent is directed through the chambers by gravity. The FOG and other biosolids are separated in the multiple chambers by gravity and flotation in the same manner as in an oil/water separator. Depending on the amount of FOG/biosolids contained in the effluent, the grease interceptor fills with solids which need to be pumped out several times a year. The pumped waste mixture is typically removed to a landfill, processed at a wastewater treatment plant, or reprocessed. These methods frequently necessitate expensive transport of hazardous material. Also, the excavation/pumping procedure may create noise and a lingering foul odor, posing a health risk. Further, it has been established that most grease interceptors are poorly maintained and consequently fail in their function to trap the FOG from the effluent. As a result, the FOG may reach the sewer system and clog lift pump stations and sewer lines. These problems are one of the main contributors to SSO's (Sanitary Sewer Overflows) that impose heavy fines levied against cities and water districts and may also cause beach closures and a multitude of health and environmental hazards.

In view of the fact that food service establishments are concerned about odor and the growing environmental concern and regulations regarding the safe transport and disposal of FOG, a device for waste treatment inside the grease interceptor is desirable. Advantages of an on-site waste treatment system include avoiding the odors, pumping, transport and disposal associated with off-site waste treatment systems. Specialized microbes have been introduced to grease interceptors; however, the short retention time and high and erratic flow rates have produced unsatisfactory results. A method of reliable, cost effective internal waste remediation has been widely sought without commercial success.

To retain the microbe culture and associated capacity for bioremediation in a grease interceptor, more specifically, to avoid flushing out the microbes with the effluent, there is a need for a microbial film support structure to solve the problem of short microbial retention time. U.S. Patent Application, Publication No. 2003/0008382, to Tisinger, et al. discloses that the gram-positive micro-organism, *Bacillus megaterium*, can effectively and efficiently degrade or decompose fats, oils and grease.

FIG. 1 illustrates a perspective cutaway view of a bioremedial device 100 for forming a microbial film on corrugated tubes. Shown in FIG. 1 are an elongated enclosure 102, media tubes 104, fasteners 106, a handle bar 108, side extensions 110, an aeration supply tube 112, a microbe injection tube 114, an aerator 116, end caps 118, air vents 120, inlet openings 122, and a biofilm 124.

The elongated enclosure 102 supports the media tubes 104 in a substantially vertical arrangement. The media tubes 104 are secured to the elongated enclosure 102 by the fasteners 106, which may be, for example, nylon cable ties. The handle bar 108 secured between the side extensions 110 facilitates the installation and servicing of the bioremedial device 100. In the illustrated embodiment, the media tubes 104 are corrugated plastic tubes typically used for flexible water drain lines. The corrugated tubes may include perforations as shown to provide a greater surface area and a more secure attachment for a microbial film than would be provided by smooth cylindrical tubes. In other embodiments, the media tubes 104 may include golf-ball type indentations and other shapes of deformations to facilitate the support and growth of the microbial film to suit specific applications within the scope of the appended claims.

The elongated enclosure 102 is flared at the bottom to provide improved vertical stability and to prevent tilting while submerged in a grease interceptor. The height of the elongated enclosure 102 is selected so that the media tubes 104 may be submerged in a grease interceptor leaving only the side extensions 110, the handle bar 108, and the upper ends of the aeration supply tube 112 and the microbe injection tube 114 remaining above the level of the effluent. A pressurized air source such as an air compressor or air pump is connected according to well known techniques to the aeration supply tube 112, for example, by a length of air hose. The aeration supply tube 112 and the microbe injection tube 114 are routed along the outside of the elongated enclosure 102 to the aerator 116.

In FIG. 1, the aerator 116 includes a manifold of perforated tubes horizontally mounted inside the elongated enclosure 102 and secured at the ends by openings on the side of the elongated enclosure 102. The end caps 118 terminate the perforated tubes of the aerator 116 outside the elongated enclosure 102, preventing the aerator 116 from shifting out of position. The air vents 120 formed along the top surface of the perforated tubes of the aerator 116 distribute the flow of air from the aeration supply tube 112 below the media tubes 104. Other configurations for the aerator 116 may be used according to well known techniques to suit specific applications within the scope of the appended claims.

The microbe injection tube 114 may be used to introduce microbes and nutrients to the media tubes 104 to form and maintain the biofilm 124, or microbial film, on the media tubes 104. The aeration supply tube 112 may be used to inject a burst of pressurized air to declog the media tubes 104 if circulation of the effluent through the media tubes 104 becomes impaired by solid objects present in the effluent. The inlet openings 122 at the bottom of the elongated enclosure 102 are made sufficiently wide to pass any solid objects that may circulate through the grease interceptor while narrow enough not to pass solid objects that may clog the media tubes 104. The width for the inlet openings may be the same or smaller than the diameter of the media tubes 104, for example, about 5 cm. The inlet openings 122 extend a sufficient height above the bottom of the grease interceptor to avoid circulating sediments from the bottom of the grease interceptor that may impair the function of the microbial film 124 on the media tubes 104. For example, the inlet openings 122 may have a height of about 25 cm, to also aid in the disruption of what is know in the art as a "channeling effect". This effect occurs as any fluid takes the least pass of resistance, in case of a grease interceptor a direct line between the feed line 304 and the discharge line 306, thus severely limiting the function of a grease interceptor. Bioremediation device 100 disrupts the channeling flow, thus increasing a grease interceptors retention time.

The handle bar 108 is secured to the elongated enclosure 102 between the side extensions 110 at the top of the elongated enclosure 102. The height of the side extensions 110 is selected to allow convenient removal and reinsertion of the elongated enclosure 102 into the grease interceptor. The media tubes 104 have an inside diameter, for example, between 5 and 10 cm, depending on the composition of the effluent. In one embodiment, the inside diameter of the media tubes 104 is the same as the inside diameter of the feed line 304 (FIG. 3) into the grease interceptor. Larger and smaller diameter media tubes may be used in various embodiments to suit specific applications within the scope of the appended claims to accommodate any size of foreign objects and biosolids that may constitute the effluent. To avoid corrosion, the elongated enclosure 102, the media tubes 104, the handle bar 108, the side extensions 110, the aeration supply tube 112, the microbe injection tube 114, and the aerator 116 may be made, for example, of ABS plastic, polyethylene, or polypropylene.

The diameter of the media tubes 104 depends on the maximum size of an object to be allowed to pass through the media tubes 104 without clogging. A typical value for the diameter of the media tubes 104 is 50 to 75 percent of the diameter of the feed line 304 of the grease interceptor. For example, the diameter of the media tubes 104 for a grease interceptor with a 10 cm feed line may be between 5 to 7.5 cm. If pre-screening is installed to prevent solid objects from entering the grease interceptor, the media tubes 104 may have a diameter, for example, as small as 2 cm to increase the available surface for biofilm formation. However, experience and extensive pilot testing have shown that solid objects are almost always present in the effluent. The media tubes 104 may be straight tubes, corrugated tubes made with coaxial rings of varying diameter, or other tubular designs that offer increased surface and are not clogged by solid objects accidentally introduced into the grease interceptor. This prevents the need for back flushing the media as typically required with other systems. Any non-corrosive plastic or other polymer chain based material, such as polypropylene, polyethylene, polyvinyl chloride, nylon, ABS, or the like may be used for the construction of the bioremedial device 100, including the biofilm media, for example, the media tubes 104, bioballs, or any other type of biofilm media.

In order to facilitate the development of a biofilm capable of sustaining the rapid breakdown of fats, oils, greases and other organics inside the grease interceptor, appropriate microbiological components are provided for optimal growth and metabolism, for example, through the microbe injector tube 114. Bacterial strains such as *bacillus megaterium, bacillus subtilis, bacillus licheniformis* and many other specific non-pathogenic cultures that are commercially available may be used to enhance the formation of the initial biofim adhesion and growth. The success and maintenance of the bioremediation device 100 depends on the microbe strains utilized and their acclimation to the biofilm media, effluent conditions, and organic loading variations that each individual application presents. The inclusion of select micro and macro-nutrients in the effluent such as calcium, potassium, zinc, selenium etc. and other selected commercially available electrolytes and metabolites may be used to ensure an adequate supply of necessary nutrients for bio-cellular growth. The use or introduction of select species of microbiologicals portends to the increased efficiencies of facilitative organisms utilizing either an aerobic or anaerobic state for the optimal efficiency in remediation of contaminants in liquid waste processing. In order to facilitate the lift function of the bioremediation device for liquid waste, the areator disburses air, which utilizes an induced electrical charge state to selected gaseous substrates. The relationship between the restriction and the differential pressure transfers into multiple advantages for energy efficiency as the acceleration induces additional flow, increases turbulence over the irregular surfaces whereby maximum oxygen, waste and biofilm contact is enhanced.

While the bioremediation device 100 may be employed with both aerobic and anaerobic biofilms, aerobic biofilms are preferred over anaerobic biofilms because aerobic films work faster and produce much less odor than anaerobic biofilms. The maximum air flow and associated fluid flow rate is preferably limited to prevent shearing of the biofilm. When shearing (loss) of biofilm occurs, the bioremediation capacity is diminished proportionately. Accordingly, the optimum air/fluid flow rate varies with flow rate parameters that include the media size, the enclosure size, the grease interceptor volume, the grease interceptor flow rate, and the effluent temperature. In one embodiment, an electronic control system continually measures each of the flow rate parameters and adjusts the air flow through the aeration supply tube 112 accordingly to maintain the optimum air/fluid flow rate around the biofilm 124 while keeping the microbial film aerobic as a direct result of being in the center of a true venturi effect created by the aerator media tubes and the elongated, preferred cylindrical non perforated enclosure. This arrangement provides maximum oxygen transfer efficiency as all air provided is available to the microbial film and non is loss to the atmosphere or air void inside the waste water enclosure or grease interceptor. Therefore a maximum energy efficiency is achieved allowing substantial cost and energy savings.

The introduction of vegetative microbes in either liquid or powder form into either the grease trap itself or injected into the fluid flow via the bacterial injection tube 114 guides the microbial cultures through the media tubes 104 due to the fluid flow generated by the rising air through and around the media tubes 104 utilizing the Venturi effect. An air flow of, for example, about 30 liters/min through the aeration supply tube 112 will allow the microbial cultures to build the fixed bed (stationary) biofilm 124 on the surface of the media tubes 104 or other biofilm media such as bioballs. Excessive fluid flow rates during the initial growing stage of the biofilm 124 of approximately 72 hours may result in biofilm shearing, producing a defective or incomplete biofilm. Once the biofilm 124 is established, an air flow of about 120 liters/min may be established through the aeration supply tube 112. A mixture of microbes and a blend of nutrients are needed to properly maintain the biofilm 124.

Figure 2:
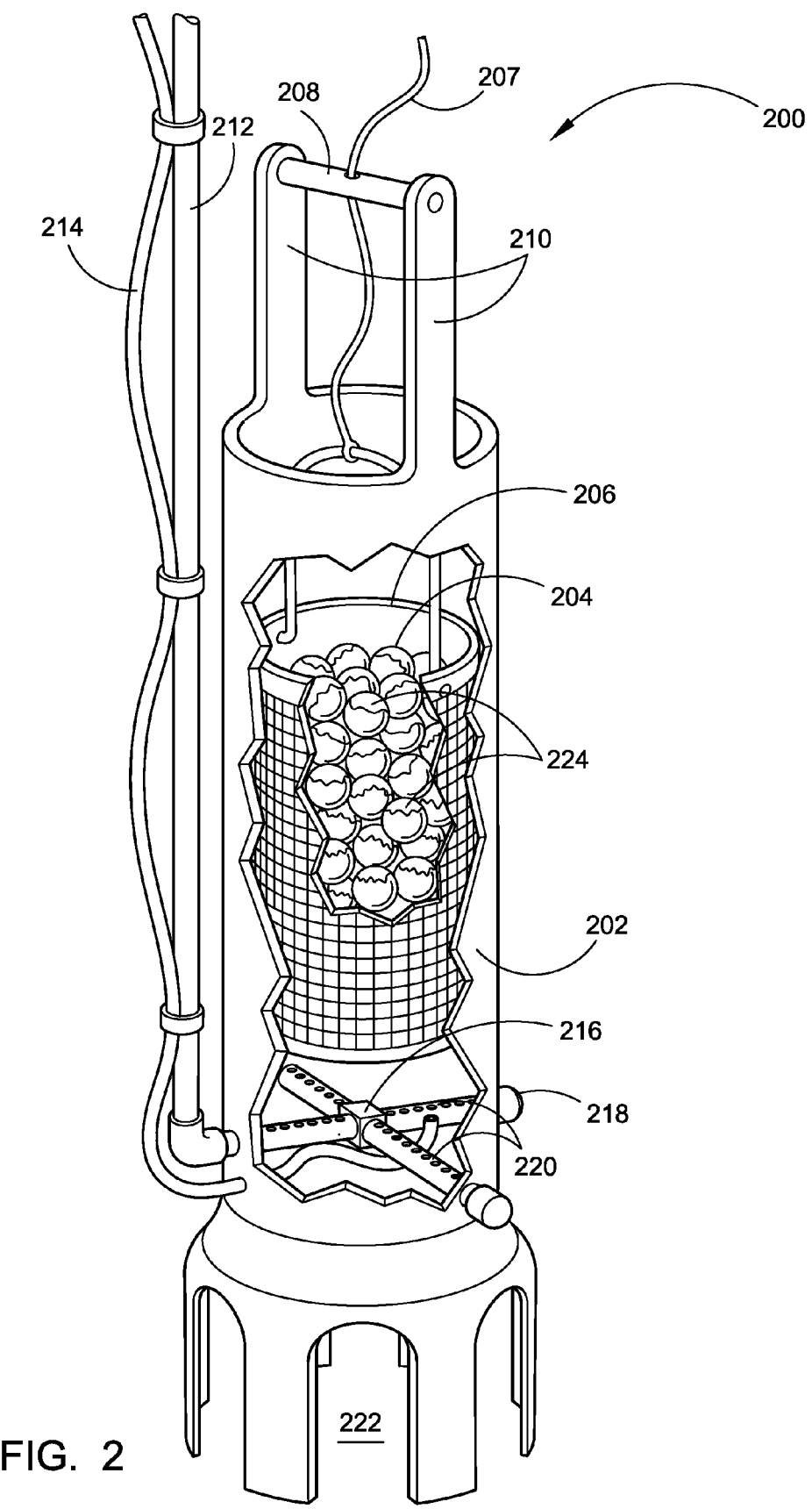
FIG. 2 illustrates a perspective cutaway view of a bioremedial device for forming a microbial film on bioballs.

FIG. 2 illustrates a perspective cutaway view of a bioremedial device 200 for forming a microbial film on bioballs. Shown in FIG. 2 are an elongated enclosure 202, bioballs 204, a media basket 206, service rope 207, a handle bar 208, side extensions 210, an aeration supply tube 212, a microbe injection tube 214, an aerator 216, end caps 218, air vents 220, inlet openings 222, and a biofilm 224.

The elongated enclosure 202 supports the bioballs 204 in the media basket 206. The media basket 206 is held in position in the elongated enclosure 202 by the service rope 207. The handle bar 208 is secured between the side extensions 210 to facilitate the installation and servicing of the bioremedial device 200. In the illustrated embodiment, the biofilm media are the bioballs 204. The bioballs 204 are plastic spheres that provide a surface area for supporting the microbial film 224. In other embodiments, other geometric shapes may be used instead of or in addition to the bioballs 204 to bioremediate effluent that contains few solid objects, such as the food waste from a wide variety of food processing plants. Accordingly, a variety of different shapes may be used in the media basket 206 to form the biofilm 224 to increase the effectiveness of the bioremediation device 200 in various embodiments to suit specific applications within the scope of the appended claims.

The elongated enclosure 202 is flared at the bottom to provide improved vertical stability and to prevent tilting while submerged in a grease interceptor. The height of the elongated enclosure 202 is selected to submerge the bioballs 204 in a grease interceptor so that only the side extensions 210, the handle bar 208, and the upper ends of the service rope 207, the aeration supply tube 212 and the microbe injection tube 214 remain above the level of the effluent. A pressurized air source such as an air compressor or air pump is connected according to well known techniques to the aeration supply tube 212, for example, by a length of air hose. The aeration supply tube 212 and the microbe injection tube 214 are routed along the outside of the elongated enclosure 202 to the aerator 216. In the illustrated embodiment, the aerator 216 is an arrangement of perforated tubes horizontally mounted inside the elongated enclosure 202 and secured to the elongated enclosure 202 by openings on the side of the elongated enclosure 202. The end caps 218 terminate the perforated tubes of the aerator 216 outside the elongated enclosure 202 to prevent the aerator 216 from shifting out of position. The air vents 220 formed along the top of the perforated tubes of the aerator 216 distribute the flow of air from the aeration supply tube 212 below the bioballs 204.

The inlet openings 222 at the bottom of the elongated enclosure 202 extend to a height above the bottom of the grease interceptor sufficient to avoid circulating sediments from the bottom of the grease interceptor that may impair the function of the microbial film 224 on the bioballs 204. For example, the height of the inlet openings 222 may be about 25 cm.

The handle bar 208 connects the side extensions 210 at the top of the elongated enclosure 202. The height of the side extensions 210 is selected to allow convenient removal and reinsertion of the elongated enclosure 202 in the grease interceptor. The service rope 207 may be used to remove the media basket 206 from the elongated enclosure 202 to inspect, clean, or replace the bioballs 204. The bioballs 204 may have an inside diameter, for example, between 5 and 10 cm, depending on the composition of the effluent. In one embodiment, the diameter of the bioballs 204 is the same as the inside diameter of the feed line into the grease interceptor. Larger and smaller diameter bioballs may be used in various embodiments to suit specific applications within the scope of the appended claims to accommodate any size of foreign objects and biosolids that may constitute the effluent. To avoid corrosion, the elongated enclosure 202, the bioballs 204, the handle bar 208, the aeration supply tube 212, the microbe injection tube 214, and the aerator 216 may be made, for example, of ABS plastic, polyethylene, or polypropylene.

Figure 3:
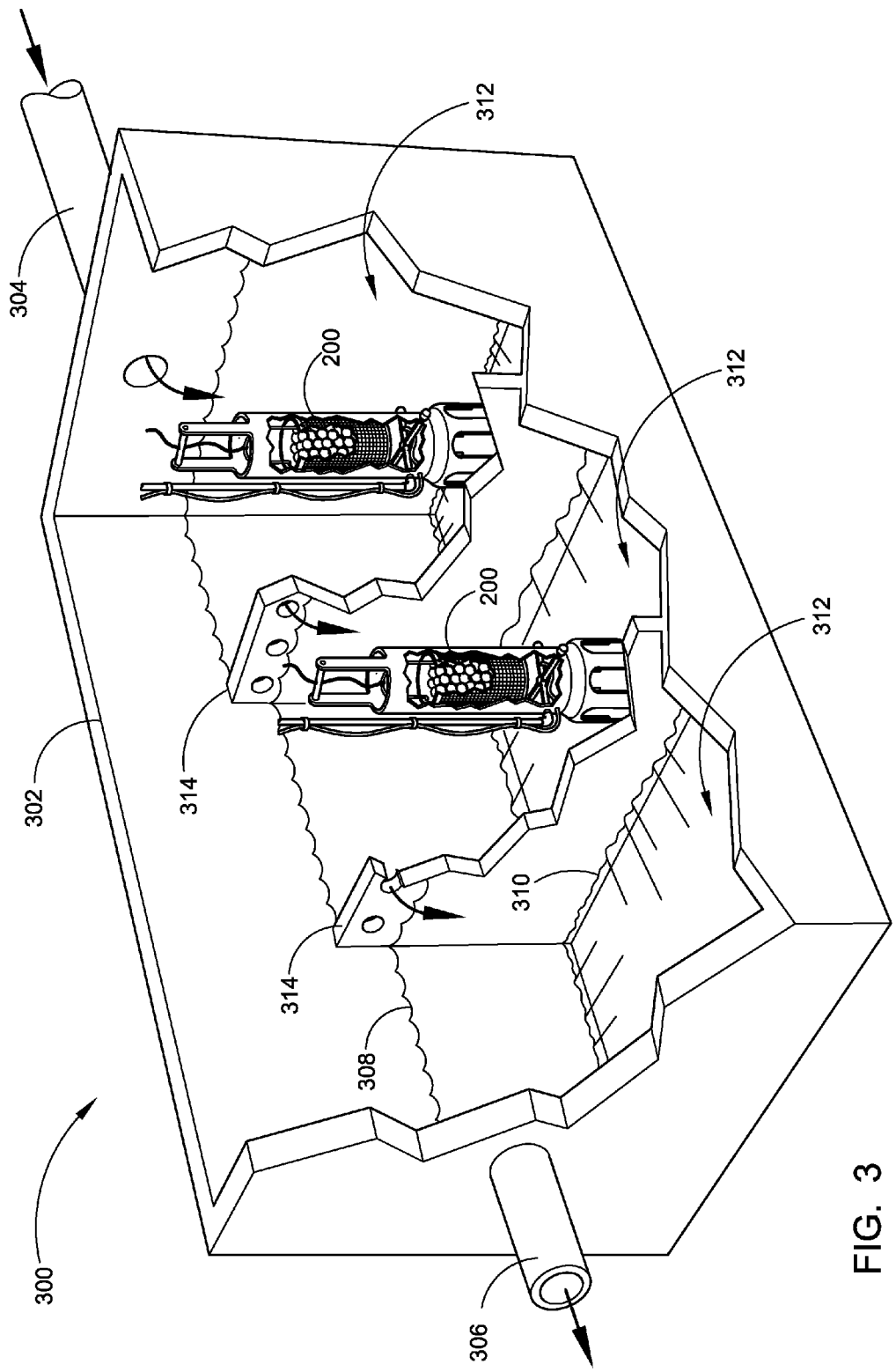
FIG. 3 illustrates a perspective cutaway view of the bioremedial device of FIG. 1 installed in a grease interceptor.

FIG. 3 illustrates a perspective cutaway view 300 of the bioremedial device of FIG. 2 installed in a grease interceptor. Shown in FIG. 3 are bioremedial devices 200, a grease receptor 302, a feed line 304, a discharge line 306, effluent 308, sediment 310, chambers 312, and weirs 314.

In FIG. 3, the grease interceptor 302 includes the three chambers 312 separated by the weirs 314. The effluent 308 enters the grease interceptor 302 from the feed line 304, circulates through the chambers 312 over the weirs 314, and exits through the discharge line 306. One or more of the bioremedial devices 200 of FIG. 2 are submerged in the effluent 308 inside each of the first two chambers 312 of the grease interceptor 302. In another embodiment, the bioremedial devices 100 of FIG. 1 may be used instead of or in addition to the bioremedial devices 200. The elongated enclosures 202 rest on the bottom of the grease interceptor 302. Because the level of the effluent 308 remains constant in the grease interceptor 302 once the effluent 308 is flowing from the discharge line 306, the height of the elongated enclosures 202 may be selected so that the handle bars 208 are just above the level of the effluent 308.

In operation, pressurized air is delivered to the aeration supply tubes 212 in FIG. 2. The pressurized air enters the effluent 308 through the air vents 220 in the aerators 216 under the bioballs 204 in the elongated enclosures 202. The air rises through the elongated enclosures 202 between the bioballs 204 around the microbial film 224 and exits the top of the bioremedial devices 200 between the side extensions 210. The rising air creates a pressure differential known as the Venturi effect that draws the effluent 308 through the inlet openings 222 in the base of the elongated enclosures 202 to form and maintain the biofilm 224 on the bioballs 204. The effluent 308 accelerates with the air flow and rises through and around the bioballs 204 inside the elongated enclosures 202.

The microbial film 224 may be formed, for example, by adding microbes manually at scheduled intervals or by metering the microbes automatically with a dosing pump. In another embodiment, the microbial film 224 is formed by naturally occurring microbes present in the grease interceptor 302. The air flow from the aerators 216 advantageously serves both to circulate the effluent 308 over the microbial film 224 and to provide the oxygen needed for the microbes to decompose the FOG in the effluent 308. The supply of oxygen and FOG passing over the surface of the bioballs 204 forms the microbial film 224. The microbial film 224 is stationary and is referred to as a fixed bed biofilm. The biological process that decomposes or degrades the FOG is called bioremediation.

The decomposition of the FOG in the effluent 308 produces water, carbon dioxide, and replenishes the microbial film 224. Because oxygen is included in the biological decomposition of the FOG, the intensity and the unpleasantness of the odor from the biological decomposition is substantially reduced compared to anaerobic processes.

For servicing, cleaning, and inspection, the bioremedial device 200 may be removed from the grease interceptor 302 by the handle bars 208. Once removed from the grease interceptor 302, the bioballs 204 may be conveniently inspected for formation of the microbial film 224 by removing the media basket 206 using the service rope 207. The bioballs 204 may then be serviced, replaced or cleaned as required. As long as a continuous or periodic supply of microbes is maintained in the effluent 308 in the grease interceptor 302, the microbial film 224 is maintained on the bioballs 204, ensuring reliable decomposition and removal of FOG from the effluent 308.

Because the bioremedial devices described above do not rely on pumps or other mechanical means immersed in the effluent to recirculate the effluent, the likelihood of mechanical and/or electrical failures due to the harsh environment inside a grease interceptor is advantageously reduced. Another advantage is that the danger of ignition or explosion of gases present in the grease interceptor from electrical devices is avoided. A further advantage is that the bioremediation devices described above are less likely to become clogged than conventional bioremediation devices from solid objects that may be accidentally introduced into the grease interceptor. Other advantages of the bioremediation devices described above include no moving parts, convenient access for inspection and service, economy of manufacture and maintenance, long operational life, avoidance of formation of toxic fumes such as hydrogen sulfite and methane, and convenient de-clogging when necessary by compressed air. The dual function of aerating the biofilm and circulating the effluent 308 around the biofilm performed by the aerators 116 and 216 in the bioremedial devices 100 and 200 without any moving mechanical or electromechanical parts is a highly advantageous design feature in terms of safety, economy, and reliability.

Figure 4:
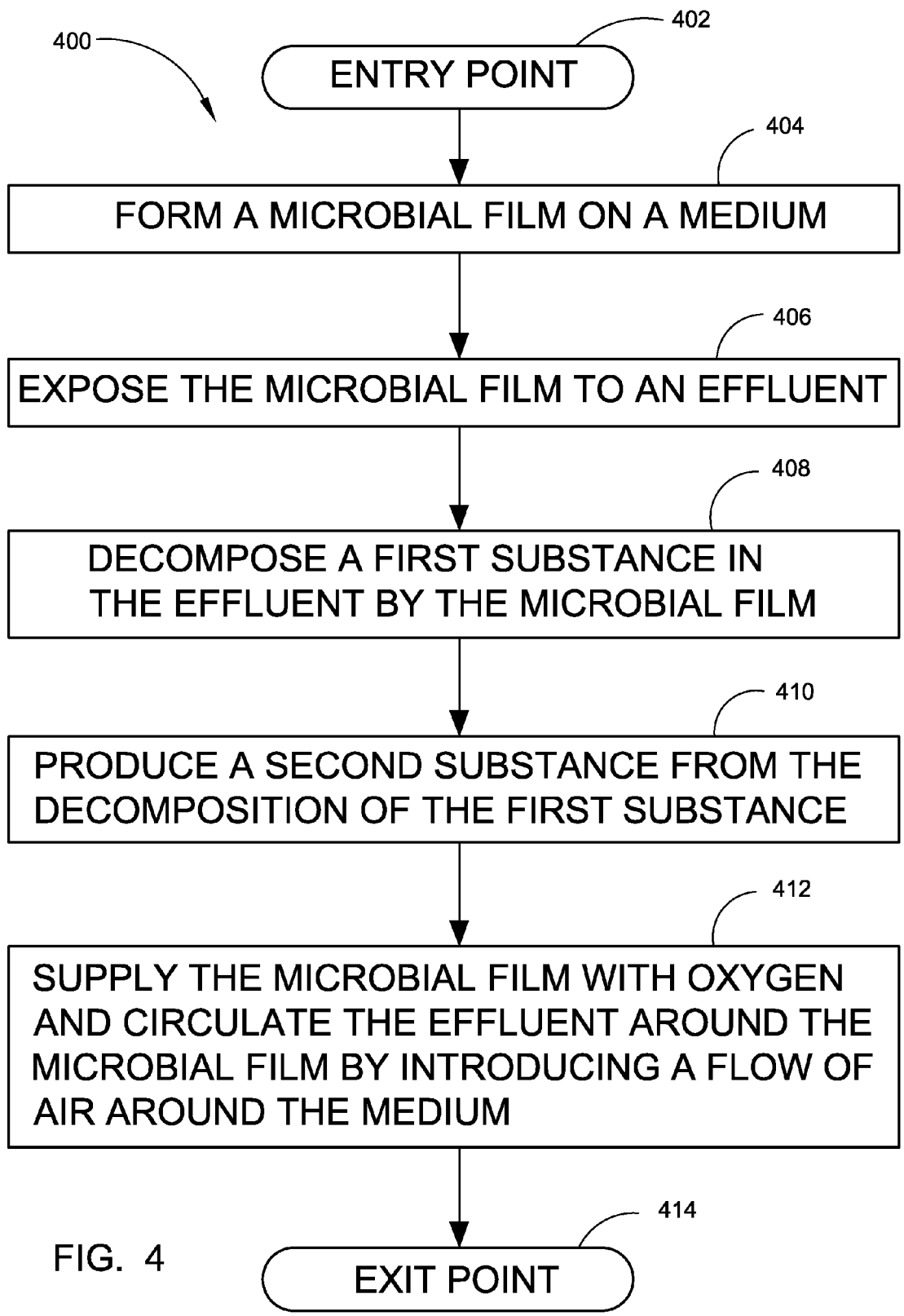
FIG. 4 illustrates a flow chart embodying the function of the bioremediation devices of FIGS. 1 and 2.

FIG. 4 illustrates a flow chart 400 embodying the function of the bioremediation devices of FIGS. 1 and 2.

Step 402 is the entry point of the flow chart 400.

In step 404, a microbial film is formed on a medium as described above.

In step 406, the microbial film is exposed to an effluent.

In step 408, a first substance in the effluent is decomposed by the microbial film.

In step 410, a second substance is produced from the decomposition of the first substance.

In step 412, the microbial film is supplied with oxygen and the effluent is circulated around the microbial film by an air flow through the medium.

Step 414 is the exit point of the flow chart 400.

Although the flowchart description above is described and shown with reference to specific steps performed in a specific order, these steps may be combined, sub-divided, or reordered without departing from the scope of the claims. Unless specifically indicated, the order and grouping of steps is not a limitation of other embodiments that may lie within the scope of the claims.

The bioremediation devices described above may also be used in other environments besides food establishments for treating waste water. In other embodiments, the bioremediation devices described above may be used for water treatment in fish farming and in fish ponds, septic tanks and cesspools, animal waste lagoons including hog lagoons, dairy lagoons, water treatment basins, and for food waste and bilge water in cruise ships, military vessels, and cargo ships. Further embodiments may find applications in car washes, machine shops, factories, water wells, water holes, hazardous waste sites requiring FOG and/or hydrocarbon bioremediation, biosolids treatment basins and tanks, and processing runoffs and discharges from soil washing/remediation projects.

The bioremediation devices described above may also work with a variety of different microbial cultures. Readily available vegetative microbes in either liquid or solid (block or powder) form may be used by introduction to the waste stream, for example, through kitchen drains, food processing floor drains, or directly into the grease interceptor.

The specific embodiments and applications thereof described above are for illustrative purposes only and do not preclude modifications and variations that may be made within the scope of the following claims.

What is claimed is:

1. A bioremediation device for liquid waste comprising:
    a waste water chamber having an inlet and an outlet;
    an elongated substantially vertical enclosure submerged in said chamber, said enclosure having a base with at least one inflow opening resting on the bottom of said chamber and an upper substantially solid-walled portion terminating at an upper opening at or below a liquid level within said chamber;
    a plurality of substantially vertical media tubes for supporting a microbial film within said upper portion of said enclosure; and
    an aeration means within said enclosure between said inflow opening and a bottom of said media tubes for generating a venturi effect through and around said media tubes.

2. The bioremediation device as in claim 1, wherein said waste water chamber is a grease trap.

3. The bioremediation device as in claim 1, and further comprising an injection tube in communication with said enclosure for injecting nutrients and microorganisms into said enclosure.

4. The bioremediation device as in claim 1, wherein said tubes are corrugated.

5. The bioremediation device as in claim 4, wherein said tubes are perforated.

6. The bioremediation device as in claim 1, wherein said tubes are perforated.

7. The bioremediation device as in claim 1, wherein said aeration means comprises a manifold of perforated tubes.

8. The bioremediation device as in claim 1, and further comprising a handle connected to an upper end of said enclosure extending above said liquid level.

9. The bioremediation device as in claim 1, wherein said enclosure is cylindrical.

10. A method of treating wastewater in a chamber comprising:
    feeding wastewater into said chamber;
    providing an elongated substantially vertical enclosure having a base with at least one inflow opening resting on the bottom of said chamber and an upper substantially solid-walled portion terminating at an upper opening at or below a liquid level within said chamber;
    providing a plurality of substantially vertical media tubes supporting a microbial film within said upper portion of said enclosure;
    aerating said wastewater by generating a venturi effect through and around said media tubes by an aerator located between said inflow opening and a bottom of said media tubes; and
    removing treated wastewater from said chamber.

11. The method of claim 10, wherein said wastewater contains fats, oils and/or grease.

12. The method of claim 10, and further comprising injecting microorganisms and nutrients into said enclosure.

13. The method of claim 10, wherein said tubes are corrugated.

14. The method of claim 13, wherein said tubes are perforated

15. The method of claim 10, wherein said tubes are perforated

16. The method of claim 10, wherein said aerator comprises a manifold of perforated tubes.

17. The method of claim 10, wherein said enclosure is cylindrical.

* * * * *